United States Patent
Blomme et al.

(10) Patent No.: US 10,806,089 B2
(45) Date of Patent: Oct. 20, 2020

(54) STUFFER TRIGGER SYSTEM FOR AN AGRICULTURAL BALER

(71) Applicant: CNH Industrial America LLC, New Holland, PA (US)

(72) Inventors: Patrick Blomme, Torhout (BE); Didier Verhaeghe, Ypres (BE); Tom Coen, Zemst (BE)

(*) Notice: Subject to any disclaimer, the term of this patent is extended or adjusted under 35 U.S.C. 154(b) by 0 days.

(21) Appl. No.: 14/914,513

(22) PCT Filed: Aug. 27, 2014

(86) PCT No.: PCT/EP2014/068197
§ 371 (c)(1),
(2) Date: Feb. 25, 2016

(87) PCT Pub. No.: WO2015/028524
PCT Pub. Date: Mar. 5, 2015

(65) Prior Publication Data
US 2016/0205871 A1    Jul. 21, 2016

(30) Foreign Application Priority Data
Aug. 27, 2013   (BE) .................................. 2013/0558

(51) Int. Cl.
A01F 15/08    (2006.01)
A01F 15/10    (2006.01)
A01F 15/04    (2006.01)

(52) U.S. Cl.
CPC ........ *A01F 15/0825* (2013.01); *A01F 15/042* (2013.01); *A01F 15/101* (2013.01); *A01F 2015/102* (2013.01)

(58) Field of Classification Search
CPC .. A01F 15/0825; A01F 15/042; A01F 15/101; A01F 2015/102
See application file for complete search history.

(56) References Cited

U.S. PATENT DOCUMENTS

| | | |
|---|---|---|
| 3,938,652 A | 2/1976 | Sacht et al. |
| 4,202,262 A | 5/1980 | Claas et al. |
| 4,275,550 A | 6/1981 | Swenson et al. |
| 4,569,282 A | 2/1986 | Galant |
| 5,467,702 A | 11/1995 | Naaktgeboren et al. |

(Continued)

FOREIGN PATENT DOCUMENTS

| | | |
|---|---|---|
| DE | 3437294 A1 | 4/1986 |
| EP | 1340421 A1 | 9/2003 |

(Continued)

*Primary Examiner* — Jeffrey C Boomer
(74) *Attorney, Agent, or Firm* — Patrick Sheldrake; Peter Zacharias

(57) ABSTRACT

An agricultural baler system has a plunger, a bale chamber, a pre-compression chamber and a stuffer unit, for moving crop from the pre-compression chamber to the bale chamber. The stuffer unit includes a stuffer fork trigger mechanism, an actuator and a controller. The actuator is coupled to the stuffer fork trigger mechanism. The controller is in controlling connection with the actuator. The actuator is configured to arm the stuffer fork trigger mechanism by moving the actuator between a first position and a second position. The actuator is further configured to be held in the first position and/or the second position with substantially no energy use.

7 Claims, 4 Drawing Sheets

(56) References Cited

U.S. PATENT DOCUMENTS

| | | | |
|---|---|---|---|
| 5,768,872 A | 6/1998 | Van Allworden | |
| 6,050,074 A | 4/2000 | Clostermeyer | |
| 6,161,368 A | 12/2000 | Wilkens et al. | |
| 6,647,706 B2 | 11/2003 | Vogt et al. | |
| 6,651,416 B2 | 11/2003 | Trelstad et al. | |
| 7,047,719 B2 | 5/2006 | Dubois | |
| 7,104,191 B1 | 9/2006 | Parker et al. | |
| 7,287,365 B2 | 10/2007 | Dubois | |
| 7,437,866 B2 * | 10/2008 | Smith | A01F 15/0833 56/341 |
| 7,478,518 B2 | 1/2009 | Kraus et al. | |
| 8,413,414 B2 | 4/2013 | Herron et al. | |
| 8,561,532 B2 | 10/2013 | Bergmann | |
| 8,683,779 B2 | 4/2014 | Duenwald et al. | |
| 8,925,450 B2 | 1/2015 | Dresher | |
| 2001/0042362 A1* | 11/2001 | Scarlett | A01F 15/00 56/10.2 G |
| 2003/0226336 A1* | 12/2003 | Hunter | A01F 15/005 53/502 |
| 2005/0072133 A1* | 4/2005 | Dubois | A01F 15/101 56/341 |
| 2006/0283166 A1* | 12/2006 | Schlesser | A01D 89/006 56/341 |
| 2007/0245704 A1* | 10/2007 | Kraus | A01F 15/08 56/10.2 R |
| 2009/0049817 A1* | 2/2009 | Viaud | A01F 15/0833 56/10.2 R |
| 2010/0288140 A1* | 11/2010 | Smith | A01F 15/0715 100/5 |
| 2012/0000377 A1* | 1/2012 | Verhaeghe O.M. | A01F 15/0825 100/45 |
| 2012/0137901 A1* | 6/2012 | Van Groenigen | A01F 15/0825 100/2 |
| 2012/0186465 A1* | 7/2012 | Dresher | A01F 15/101 100/35 |
| 2012/0204740 A1* | 8/2012 | Bergmann | A01F 15/101 100/99 |
| 2012/0221213 A1* | 8/2012 | Seeger | A01F 15/0825 701/50 |
| 2012/0240793 A1* | 9/2012 | Dedeurwaerder | A01F 15/042 100/3 |
| 2012/0297992 A1* | 11/2012 | Oakes | A01F 15/0705 100/70 R |
| 2014/0196919 A1* | 7/2014 | Kowalchuk | A01B 63/002 172/2 |
| 2015/0027325 A1* | 1/2015 | Bonte | A01F 15/0841 100/35 |
| 2015/0134175 A1* | 5/2015 | Derscheid | A01F 15/0825 701/23 |
| 2015/0208586 A1* | 7/2015 | Lang | A01F 15/0825 100/2 |
| 2016/0088800 A1* | 3/2016 | Lang | A01F 15/0825 56/10.2 R |
| 2016/0165802 A1* | 6/2016 | Verhaeghe | B30B 9/3007 701/50 |
| 2017/0135286 A1* | 5/2017 | Benevelli | A01F 15/10 |
| 2017/0142906 A1* | 5/2017 | Benevelli | A01F 15/0841 |

FOREIGN PATENT DOCUMENTS

| | | |
|---|---|---|
| EP | 1769674 A1 | 4/2007 |
| FR | 2232985 A1 | 1/1975 |
| WO | 9203038 A1 | 3/1992 |

* cited by examiner

STUFFER TRIGGER SYSTEM FOR AN AGRICULTURAL BALER

This application is the US National Stage filing of International Application Serial No. PCT/EP2014/068197 filed on Aug. 27, 2014 which claims priority to Belgian Application BE2013/0558 filed Aug. 27, 2013, each of which is incorporated herein by reference in its entirety.

FIELD OF THE INVENTION

The present invention relates to agricultural balers, and, more particularly, to a system used on such agricultural balers to trigger the actuation of the stuffer fork.

DESCRIPTION OF THE RELATED ART

Agricultural balers are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (for purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which may chop the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, after the wad is injected into the bale chamber, the plunger compresses the wad of crop material into a flake against previously formed flakes to form a bale and, at the same time, gradually advances the bale toward the outlet of the bale chamber. Pressure exerted by the walls of the bale chamber dictates the frictional force required to overcome static friction and shift the flakes in the chamber. An increased force to shift the flakes causes the plunger to compact the flakes tighter, to thereby produce a higher density bale.

When enough flakes have been added and the bale reaches a full (or other predetermined) size, a number of knotters are actuated which wrap and tie twine, cord, or the like, around the bale while it is still in the main bale chamber. The twine is cut and the formed baled is ejected out the back of the baler as a new bale is formed.

As the bale is being formed the stuffer unit repeatedly moves in coordination with the position of the plunger to move a wad, regardless of the size of the wad, into the bale chamber. Even if there is no crop material in the pre-compression chamber the stuffer forks are operated since they are linked to the plunger mechanism.

What is needed in the art is a stuffer system that reduces the amount of energy consumed during operation.

SUMMARY OF THE INVENTION

The present invention provides an energy saving stuffer trigger system for controlling the movement of the wad when the wad reaches a predetermined size and to control the timing of the stuffer forks.

The invention in one form is directed to an agricultural baler system having a plunger, a bale chamber, a pre-compression chamber and a stuffer unit, for moving crop from the pre-compression chamber to the bale chamber, such that the crop can be compressed by the plunger into bales. The stuffer unit includes a stuffer fork trigger mechanism, an actuator and a controller. The actuator is coupled to the stuffer fork trigger mechanism. The controller is in controlling connection with the actuator. The actuator is configured to arm the stuffer fork trigger mechanism by moving the actuator between a first position and a second position. The actuator is further configured to be held in the first position and/or the second position with substantially no energy use.

The invention in yet another form is directed to a stuffer unit of an agricultural baler. The stuffer unit is configured to move a wad of the crop material into the bale chamber. The stuffer unit includes a stuffer fork trigger mechanism, an actuator and a controller. The actuator is coupled to the stuffer fork trigger mechanism. The controller is in controlling connection with the actuator. The actuator is configured to arm the stuffer fork trigger mechanism by moving the actuator between a first position and a second position. The actuator is further configured to hold the actuator in the first position and the second position with substantially no energy use.

The invention in yet another form is directed to a method of actuating a stuffer fork trigger mechanism in an agricultural baler system. The method includes the steps of receiving and commanding. The receiving step receives a wad sensor signal indicative of the need to move a wad from a pre-compression chamber to a bale chamber. The commanding step commands the arming of a stuffer fork trigger mechanism dependent upon receipt of the wad sensor signal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention in one form, and such exemplification is not to be construed as limiting the scope of the invention in any manner.

DETAILED DESCRIPTION OF THE INVENTION

Figure 1:
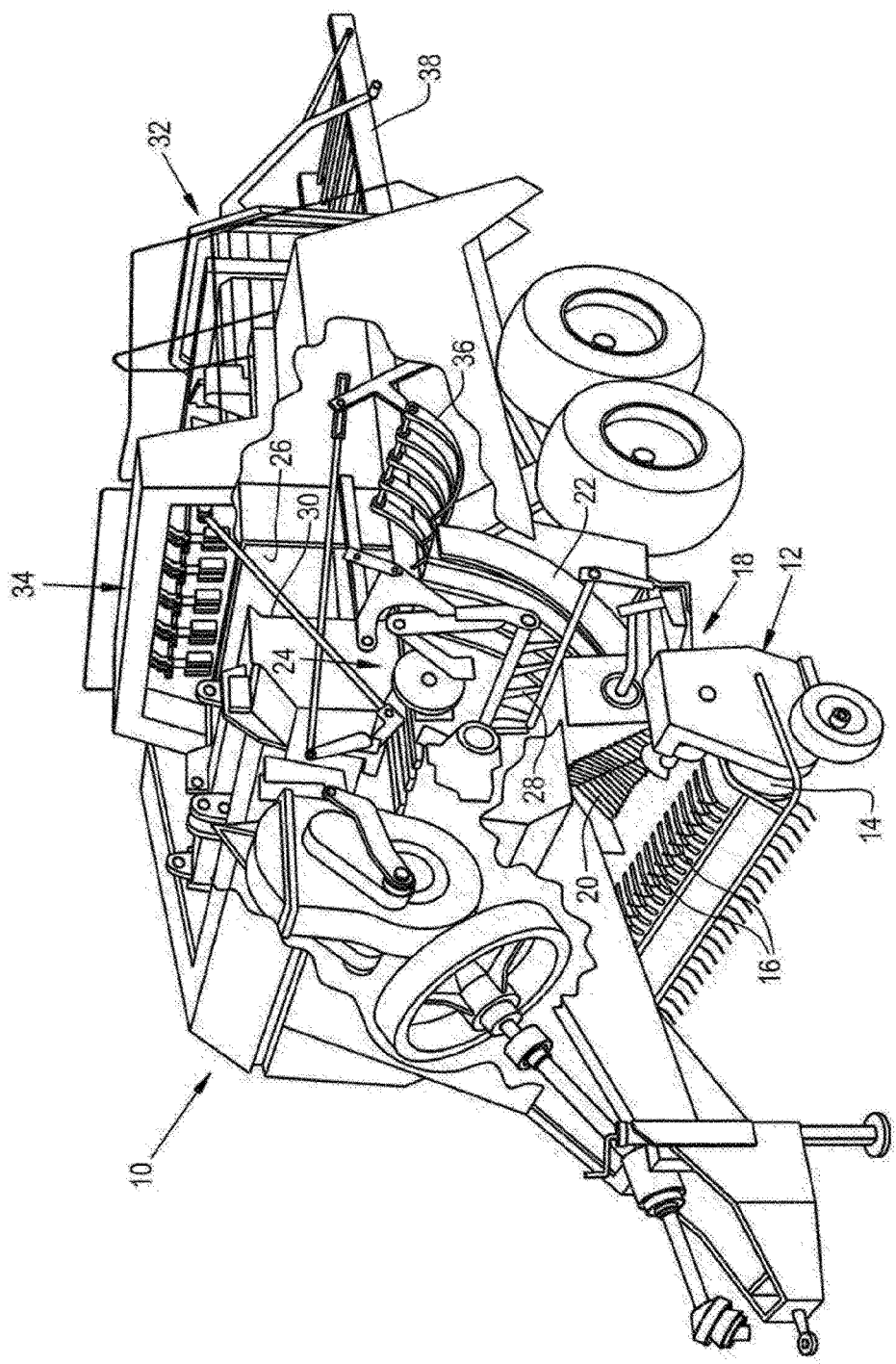
FIG. 1 is a perspective cutaway view showing the internal workings of a large square baler having an embodiment of a stuffer trigger system of the present invention associated therewith.

Referring now to the drawings, and more particularly to FIG. 1, there is shown an agricultural harvester in the form of a large square baler 10. FIG. 1 is a perspective cutaway view showing the internal workings of a large square baler 10.

The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26. The stuffer unit 24 includes stuffer forks 28 which thrust the wad of crop directly in front of a plunger 30, which reciprocates within the bale chamber 26 and compresses the wad of crop into a flake. The stuffer forks 28 return to their original stationary state after the wad of material has been moved into the bale chamber 26. The plunger 30 compresses the wads of crop into flakes to form a bale and, at the same time, gradually advances the bale toward an outlet 32 of the bale chamber 26. The bale chamber 26 and plunger 30 function as the second stage for crop compression. When enough flakes have been added and the bale reaches a full (or other predetermined) size, the knotters 34 are actuated which wrap and tie twine around the bale while it is still in the bale chamber 26. Needles 36 bring the lower twine up to the knotters 34 and the tying process then takes place. The twine is cut and the formed bale is ejected from a discharge chute 38 as a new bale is formed.

Figure 2:
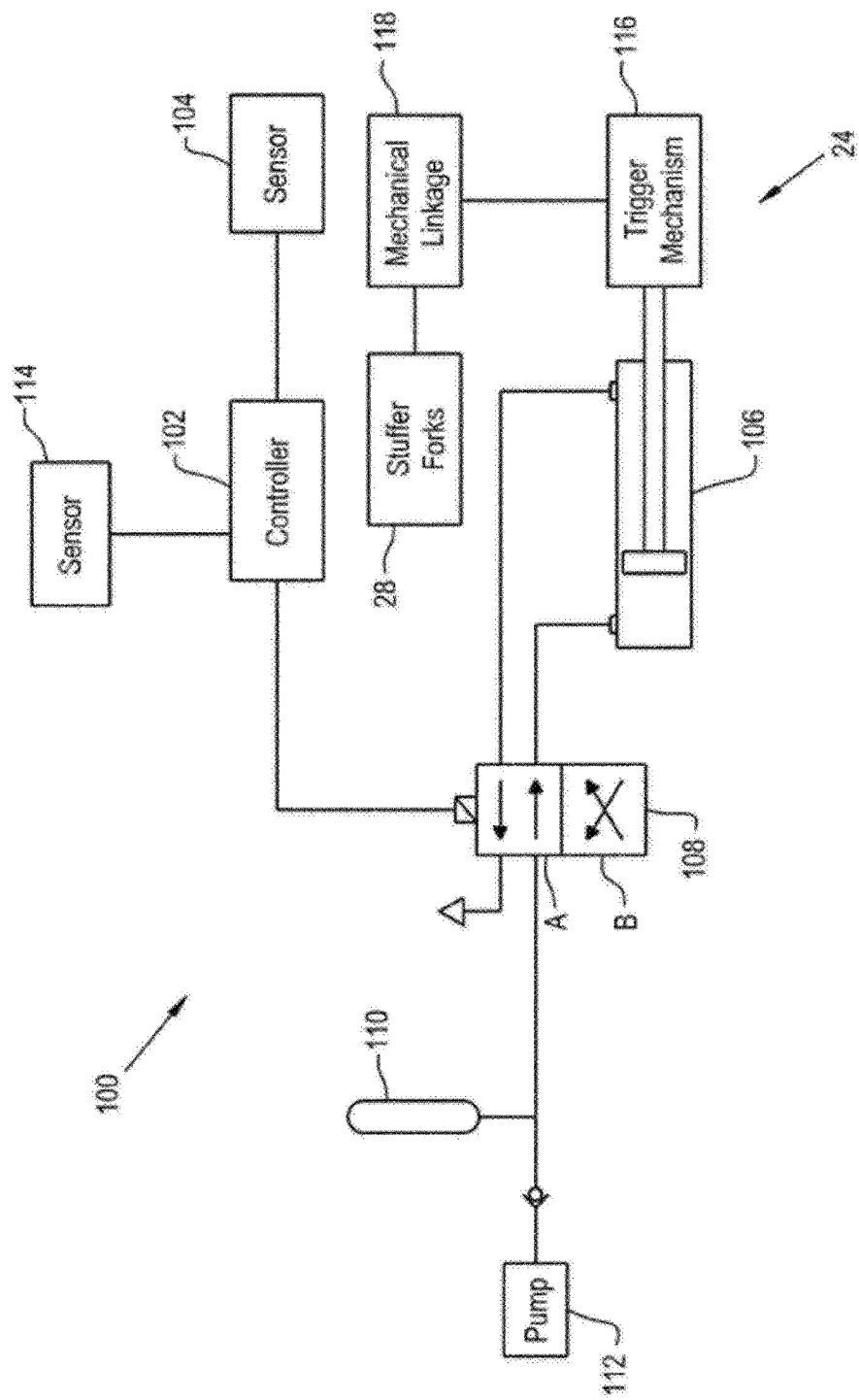
FIG. 2 is a schematical view of the stuffer trigger system used by the baler of FIG. 1.

Now, additionally referring to FIG. 2 there is schematically illustrated an embodiment of a stuffer trigger system 100 of the present invention incorporated in the baler 10. The stuffer trigger system 100 includes a controller 102, a wad sensor 104, an actuator 106, a valve 108, an accumulator 110, a pump 112, a plunger position sensor 114, a trigger mechanism 116, and a mechanical linkage 118. The controller 102 may be a standalone controller, or the functions described herein may be carried out by another controller that carries out other functions of the baler 10. The controller 102 is communicatively coupled to the sensors 104 and 114, and the valve 108. The wad sensor 104 determines the amount of crop material that has accumulated in the pre-compression chamber 22 and sends a wad sensor signal to the controller 102 when the wad reaches a predetermined size. The wad sensor 104 may come into contact directly or indirectly with the crop material. It is also contemplated that the wad sensor 104 may be a noncontact sensor, such as an infrared sensor. It is further contemplated that sensing may take place by measuring the presence or flow of the crop material before the crop material enters the pre-compression chamber 22, such as by measuring the rotor or the pick-up torque. The controller 102 also receives positional information about the plunger 30 so that the actuation of actuator 106 takes place in coordination with the position of the plunger 30 thereby precluding damage to the trigger mechanism 116.

The actuator 106 is in the form of a pneumatic cylinder connected to the trigger mechanism 116. Other types of actuators are also contemplated such as hydraulic and electrical. The trigger mechanism 116 is positioned in one of two positions by the actuator 106, which correspond with the extended and retracted positions of the actuator 106. For purposes of discussion, the extended position of the actuator 106 will be considered as placing the trigger mechanism 116 in an armed mode, and the retracted position as placing the trigger mechanism 116 in an unarmed mode. As discussed in more detail later, the armed and unarmed modes are selected under the control of the controller 102. The pump 112, which may be an air compressor, is used to provide pressurized air to the stuffer trigger system 100. The compressed air is stored in the accumulator 110 until it is needed to change the position of the actuator 106. When the valve 108 is switched from one position to the other by the controller 102 the compressed air held in accumulator 110 is used to move the actuator 106 to an opposite position thereby moving the trigger mechanism 116. When the trigger mechanism 116 is armed the mechanical linkage 118 will then provide the mechanical force to the stuffer fork 28 in synchronization with the plunger 30.

Figure 3:
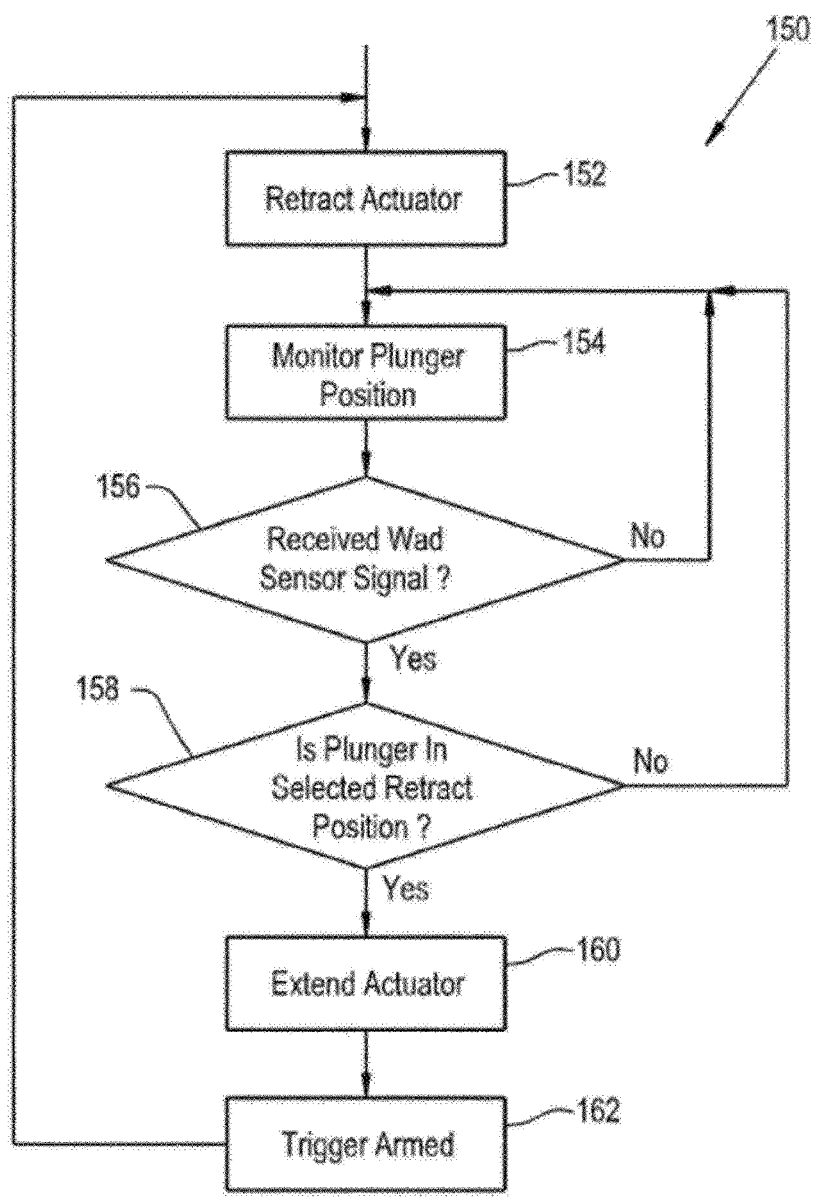
FIG. 3 is a flowchart depicting an embodiment of a method carrying out the functions of the stuffer trigger system of FIG. 2 in the baler of FIG. 2.
Figure 4:
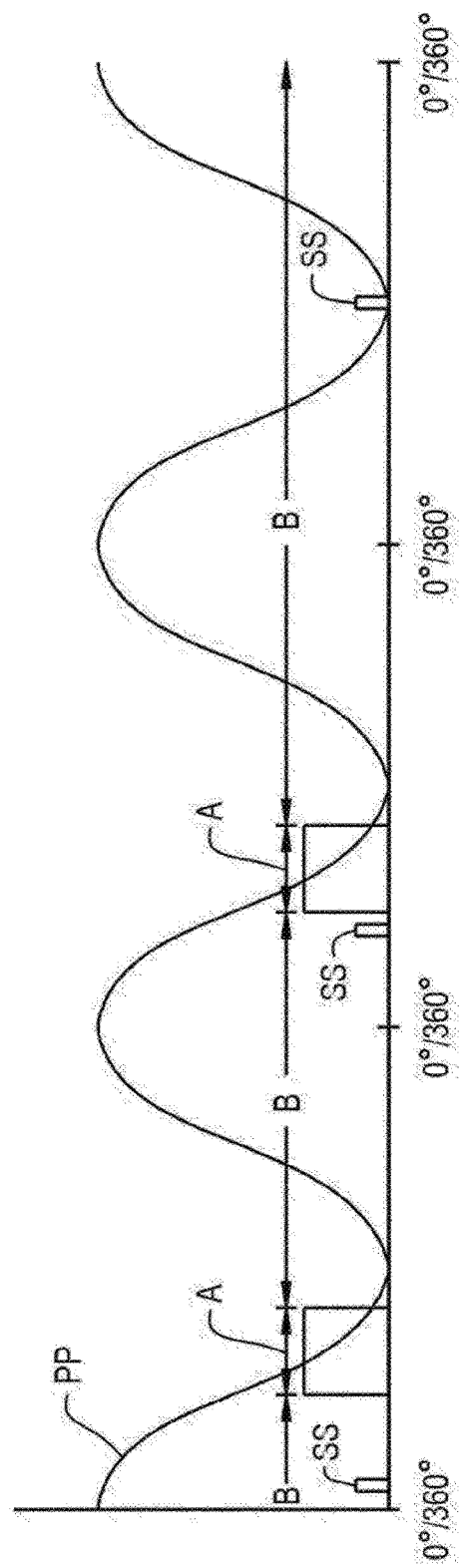
FIG. 4 is a view of signals produced and used by the stuffer trigger system of FIG. 2 and to assist in the explanation of the method of FIG. 3.

Now, additionally referring to FIGS. 3 and 4 there is illustrated a method 150 that is carried out by the controller 102. The method 150 includes a step 152, where the actuator 106 is moved to a retracted position. For the sake of discussion the retracted position will be considered to be the left position in FIG. 2 and condition B in FIG. 4 indicating a position of the valve 108, with an extended position being to the right position in FIG. 2 and condition A in FIG. 4. FIG. 4 illustrates three cycles of the plunger 30 with the plunger position PP being shown having a sinusoidal shape with the higher portion indicating that the plunger 30 is extended farther into the bale chamber 26 and the lower portion indicating that the plunger 30 is retracted relative to the bale chamber 26. The trigger mechanism 116 serves to provide the armed and unarmed modes of the stuffer trigger system 100 so that the stuffer forks 28 will only be activated when a wad of sufficient size is accumulated and to preclude the movement of the stuffer forks 28 at an inappropriate point in the cycling of the plunger 30.

At step 154 the plunger 30 position is monitored by way of the plunger position sensor 114 sending a plunger position signal, which may be substantially similar to, or at least representative of the plunger position PP. At step 156, the controller determines if the wad sensor signal SS has been received, if not then the method 150 returns to step 154 and the stuffer forks trigger mechanism 116 remains unarmed. If the wad sensor signal SS is received at step 156 then the method 150 proceeds to step 158 and the plunger position signal PP is referred to by the controller 102 to determine if the position of plunger 30 is in a selected retracted range. If the plunger 30 is in the retracted position (or when the plunger 30 reaches the predetermined retracting position range) then the stuffer fork trigger mechanism 116 is armed 162 by the extension of the actuator 106 at step 160. For the sake of clarity the stuffer fork trigger mechanism 116 is armed by the pulse of the actuator 106 and the stuffer fork trigger mechanism 116 may remain armed after the actuator 106 is retracted at step 152. The stuffer fork trigger mechanism 116 is disarmed by the action of the mechanism as the wad is cycled into the bale chamber 22. If the wad sensor signal SS occurs too late in the cycle, as shown in the third (right most) cycle of FIG. 4 (or if it does not occur at all) then no A period exists for that cycle with the valve 108 remaining in the B position, and the actuator 106 remains retracted and the stuffer fork trigger mechanism 116 remains unarmed for the balance of the cycle.

Once the stuffer fork trigger mechanism 116 is armed (step 162) by the extended actuator 106 (step 160), the actuator 106 is retracted as schematically shown as the end of period A (step 152) leaving the stuffer fork trigger mechanism 116 armed, until disarmed as discussed above. Another way of looking at the interplay of method 150 with the stuffer triggering system 100 is that step 152 is executed to cause the A to B transition and that step 160 is executed to cause the B to A transition. It is also contemplated that the B to A transition may shift in the cycle under the control of the controller 102 resulting in a shorted A period, for example if the wad sensor signal SS occurs later in the cycle, but still within a predetermined range of values. However, when the wad sensor signal SS comes too late for the stuffer fork 28 to have adequate time to move the wad into the bale chamber 26 then the controller 102 holds off on arming the trigger mechanism 116 until the next cycle to extend the actuator 106.

It is further contemplated that the controller 102 may be configured to alter the timing of the A to B and B to A transitions as the speed of the cycles vary so that delays in the system can be compensated to ensure that no conflict occurs between the plunger 30 and the stuffer fork 28.

As alluded to above, if the crop material in the pre-compression chamber 22 is not enough to warrant the wad being placed into the bale chamber 26, then the actuator 106 stays in the retracted position and the trigger mechanism 116 in the unarmed position thus causing stuffer forks 28 to remain retracted to eliminate unneeded movement and to save energy. The holding of the actuator 106 in either the retracted or the extended position is done with no, or substantially no, energy usage.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler system, comprising;
   a plunger;
   a bale chamber, the plunger configured for operating within the bale chamber;
   a pre-compression chamber coupled to the bale chamber;
   a stuffer unit for moving crop material from the pre-compression chamber to the bale chamber such that a wad of the crop material can be compressed by the plunger into bales; and
   a plunger position sensor communicatively coupled to a controller,
   the stuffer unit comprising:
      a wad sensor directly or indirectly in contact with the crop material in the pre-compression chamber, the wad sensor configured to detect an amount of the crop material accumulated in the pre-compression chamber, the amount of the crop material indicative of a size of the wad of the crop material within the pre-compression chamber;
      a stuffer fork trigger mechanism;
      a linear actuator coupled to the stuffer fork trigger mechanism; and
      a controller operably connected to a valve controlling flow to the actuator and the wad sensor, the actuator configured to arm the stuffer fork trigger mechanism by moving a rod of the actuator between a first position and a second position, the actuator further configured to be held in at least one of the first position and the second position until the wad sensor detects that the amount of the crop material accumulated in the pre-compression chamber is indicative of a wad of a predetermined size; wherein the valve is in fluid communication with an accumulator and when the valve is switched from one position to another by the controller the fluid held in accumulator is used to move the actuator to an opposite position thereby moving the trigger mechanism;
   wherein the wad sensor is communicatively coupled with the controller, the wad sensor configured to send a wad signal to the controller indicating that the wad has reached the predetermined size, the actuator being moved from the first position to the second position dependent upon the controller receiving the wad signal; and
   wherein the plunger position sensor configured to send a plunger position signal to the controller representative of at least one of a linear position of the plunger and an angular position of a rotating portion of the plunger, the movement of the stuffer fork trigger mechanism being additionally dependent upon the plunger position signal.

2. The agricultural baler system of claim 1, wherein the controller is further configured to not adjust the valve to actuate the actuator while the wad signal occurs when the plunger position signal is within a predetermined range.

3. The agricultural baler system of claim 1, wherein the controller is further configured to control the valve to actuate the actuator when the wad signal occurs while the plunger position signal is within a predetermined range.

4. The agricultural baler system of claim 1, wherein the controller is further configured to control the valve to only position the actuator in either the first position and the second position.

5. The agricultural baler system of claim 1, wherein the pressurized fluid is one of hydraulic fluid and air.

6. The agricultural baler system of claim 5, wherein the pressurized fluid is air.

7. An agricultural baler system, comprising;
   a plunger;
   a bale chamber, the plunger configured for operating within the bale chamber;
   a pre-compression chamber coupled to the bale chamber; and a stuffer unit for moving crop material from the precompression chamber to the bale chamber such that a wad of the crop material can be compressed by the plunger into bales, the stuffer unit comprising:
  a mechanical linkage;
  an actuator;
  a controller operably connected to a valve in fluid communication with the actuator, wherein when the valve is switched from one position to another by the controller fluid held in an accumulator is used to move the actuator to an opposite position thereby moving a stuffer fork trigger mechanism; and
  wherein when the stuffer fork trigger mechanism is armed the mechanical linkage will then provide the mechanical force to the stuffer fork in synchronization with the plunger;

wherein the actuator is coupled to the stuffer fork trigger mechanism and is configured to arm the stuffer fork trigger mechanism by moving a rod of the actuator between a first position and a second position, the actuator being further configured to be held in at least one of the first position and the second position.

\* \* \* \* \*